(12) United States Patent
Shimura

(10) Patent No.: US 6,564,000 B2
(45) Date of Patent: May 13, 2003

(54) IMAGE PROCESSING METHOD AND SYSTEM

(75) Inventor: Kazuo Shimura, Kanagawa-ken (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/161,678

(22) Filed: Sep. 29, 1998

(65) Prior Publication Data

US 2002/0090200 A1 Jul. 11, 2002

(30) Foreign Application Priority Data

Sep. 30, 1997 (JP) ............................................. 9-265328

(51) Int. Cl.[7] .............................. H04N 5/76; H04N 5/91
(52) U.S. Cl. ........................................... 386/46; 386/95
(58) Field of Search ........................... 386/46, 107, 117, 386/95, 38; 358/906, 909.1, 518; 348/96, 97; 382/167

(56) References Cited

U.S. PATENT DOCUMENTS 5,633,726 A * 5/1997 Timmermans ................ 386/70
5,859,951 A * 1/1999 Aihara et al. ................ 386/107
5,874,988 A * 2/1999 Gu .............................. 348/97
5,909,241 A * 6/1999 Hibino et al. ................. 348/97
6,009,233 A * 12/1999 Tsujimura et al. ............. 386/95
6,201,893 B1 * 3/2001 Shiraiwa et al. ............ 382/167

* cited by examiner

*Primary Examiner*—Huy Nguyen
(74) *Attorney, Agent, or Firm*—Sughrue Mion, PLLC

(57) ABSTRACT

An image processing method is disclosed wherein a storage medium storing image data, key information appended to the image data, and image processing parameters attached to the image data and representing image processing to be effected on the image data is accessed to read the image data and the image processing parameters and the read image data are processed based on the image processing parameters. The image processing method includes a step of reading the key information when one or more image processing parameters attached to the image data are inappropriate for the image processing, a step of establishing, based on the read key information, new image processing parameters appropriate for the image processing, and a step of image-processing the image data based on the new image processing parameters. A system for conducting the method is also disclosed.

20 Claims, 1 Drawing Sheet

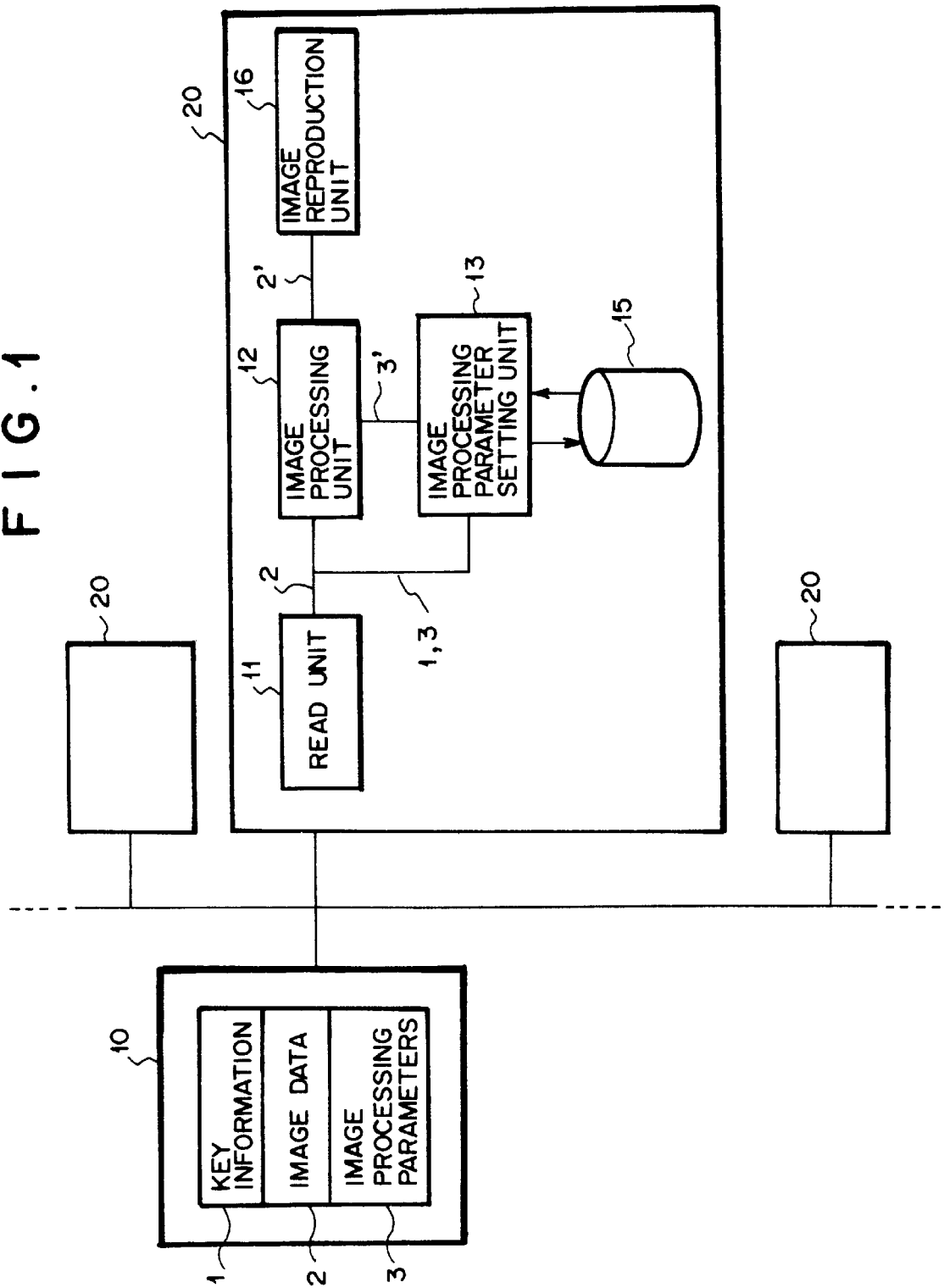

IMAGE PROCESSING METHOD AND SYSTEM

BACKGROUND OF THE INVENTION

1. Field of the Invention

This invention relates to an image processing method and system for image processing image data acquired by, for example, a medical imaging system.

2. Description of the Related Art

When image data relating to, for example, an image taken by a medical imaging system are stored on an optical disk or other such storage medium, they are stored together with image processing parameters indicating image processing to be effected on the image data. When the image data are reproduced by an image reproducing system, the image processing parameters are read from the storage medium together with the image data, and an image processing unit of the image reproducing system processes the image data based on the read image processing parameters. The image-processed data are then output to a monitor or printer to be represented as a visible image. The image processing includes both image enhancement processing, such as frequency processing and gradation processing, and formatting processing, such as image enlargement/reduction processing and single or double image representation processing. The image processing parameters are required when these different kinds of image processing are conducted.

Medical imaging systems are often networked so that all systems can access a single storage medium. Since the medical imaging systems of the network all record their image data on a common storage medium, every system of the network can read and reproduce both its own images and the images of the other systems.

Such a network usually includes various types (generations) of medical imaging systems, some new and some old. This may cause problems because a newer, more advanced medical imaging system ordinarily has new processing features and some or all of the image processing parameters attached to image data acquired by an older (earlier generation) medical imaging system (outmoded image data) are not usable with these new features. The newer, more advanced medical imaging system may therefore not be able to reproduce the outmoded image data. Even if it can, it will only be able to obtain an image processed based on the outmoded image processing parameters attached to the outmoded image data.

Even if a newer system and an older system conduct the same kinds of image processing, a problem arises if, as often happens, the newer system uses upgraded image processing parameters in order to improve the image processing and obtain an image more suitable for diagnostic purposes. In such a case, the newer system will only be able to process the outmoded image data based on the old image processing parameters, not withstanding that the outmoded image data are attached with image processing parameters corresponding to the types of image processing conducted by the newer system.

More advanced medical imaging systems incorporating new and improved image processing capabilities for reproducing images suitable for use in diagnosis have therefore not been able to utilize their capabilities to the full when reproducing images from outmoded image data because they either are totally incapable of reproducing images using the outmoded image data or, at any rate, cannot apply their new processing features to reproduce enhanced images suitable for use in diagnosis.

SUMMARY OF THE INVENTION

This invention was accomplished in light of the foregoing problems and has as an object to provide an image processing method and an image processing system that enable a more advanced medical imaging system to image-process outmoded image data for obtaining an image suitable for use in diagnosis even if some or all image processing parameters used by the more advanced medical imaging system are not attached to the outmoded image data.

The invention achieves this object by providing an image processing method wherein a storage medium storing image data, key information appended to the image data, and image processing parameters attached to the image data and representing image processing to be effected on the image data is accessed to read the image data and the image processing parameters and the read image data are processed based on the image processing parameters, the image processing method comprising a step of reading the key information when one or more image processing parameters attached to the image data are inappropriate for the image processing, a step of establishing, based on the read key information, new image processing parameters appropriate for the image processing, and a step of image-processing the image data based on the new-image processing parameters.

By "image processing parameters" is meant parameters required when the image data are subjected to frequency processing, gradation processing and other types of image enhancement processing, enlargement/reduction processing, formatting of number of displayed images and the like.

Typical cases in which the image processing parameters are "inappropriate for the image processing" include:

1) The system conducting the image processing by the invention image processing method is an advanced one, the image data and attached image processing parameters stored on the storage medium were produced by an older, less advanced system, and the attached image processing parameters do not include one or more parameters needed for one or more types of image processing conducted by the more advanced system; and 2) Parameters for all types of image processing conducted by the advanced system are included but the advanced system is designed to conduct these types of image processing using improved technologies and therefore cannot utilize its full image processing capability when conducting image-processing based on the image processing parameters attached to the image data.

By "key information" is meant information that does not vary between different types of image processing to be carried out on the image data. This information includes, for example, the portion of the object that was imaged and the imaging method used at the time the image data were acquired. The image data key information is the same for all sets of image data acquired, for example, by imaging the same object portion or by using the same imaging method, irrespective of the image processing to be conducted.

The image processing method according to the invention is preferably configured so that when one or more image processing parameters attached to the image data are inappropriate for the image processing, the image processing can be switched between image processing using attached image processing parameters and image processing using new image processing parameters.

The invention further provides an image processing system comprising a storage medium storing image data, key information appended to the image data, and image processing parameters attached to the image data and representing image processing to be effected on the image data, a read unit for reading the image data and the image processing parameters from the storage medium, an image processing unit for image-processing the image data read by the read unit based on the image processing parameters, a key information read unit for reading the key information when one or more image processing parameters attached to the image data are inappropriate for the image processing to be conducted by the image processing unit, and a parameter setting unit for establishing new image processing parameters appropriate for the image processing to be conducted by the image processing unit based on the key information read by the key information read unit, the image processing unit being capable of image-processing the image data based on the new image processing parameters established by the parameter setting unit.

The image processing system according to the invention preferably further comprises a switch unit for switching the image processing conducted by the image processing unit between image processing using the attached image processing parameters and image processing using new image processing parameters when one or more image processing parameters attached to the image data are inappropriate for the image processing.

In the image processing method and system according to the invention, when one or more image processing parameters attached to image data stored on the storage medium are inappropriate for the image processing, the key information appended to the image data is read and new image processing parameters appropriate for the image processing are established. The image data are then image-processed using the newly established image processing parameters. Therefore, if it happens that 1) the system conducting the image processing by the invention image processing method and system is an advanced one, the image data and the image processing parameters stored on the storage medium were produced by a less advanced system, and the stored image processing parameters do not include one or more image processing parameters needed for the image processing conducted by the advanced system or that 2) the parameters are included but the advanced system is designed to conduct the types of image processing concerned using improved technologies and therefore cannot utilize its full image processing capability when conducting image-processing based on the image processing parameters attached to the image data, then, notwithstanding, optimum image processing of the image data can be effected by establishing new image processing parameters and using the new image processing parameters to image-process the image data.

Since the invention further enables switching between image processing using attached image processing parameters and image processing using new image processing parameters, it can also deal with the case where it is desired to conduct the image processing using only the image processing parameters attached to the image data.

BRIEF DESCRIPTION OF THE DRAWINGS

FIG. 1 is a schematic diagram showing the configuration of a medical imaging system network incorporating an image processing method and an image processing system that are embodiments of the invention.

PREFERRED EMBODIMENT OF THE INVENTION

An embodiment of the invention will now be explained with reference to the drawings.

FIG. 1 is a schematic diagram showing the configuration of a medical imaging system network incorporating an image processing method and system according to the invention. As shown in FIG. 1, the medical imaging system network is composed of a storage medium 10, e.g., an optical disk, and multiple medical imaging systems 20 connected with the storage medium 10. The storage medium 10 stores image data 2, key information 1 appended to the image data 2, and image processing parameters 3 prescribing image processing to which the image data 2 are to be subjected. Connections are provided for enabling access of the storage medium 10 by the medical imaging systems 20.

Each medical imaging system 20 includes a read unit 11 for reading the key information 1, image data 2 and image processing parameters 3 stored in the storage medium 10, an image processing unit 12 for, as described later, image-processing the image data 2 read by the read unit 11, an image processing parameter setting unit 13 for using the key information 1 and the image processing parameters 3 read by the read unit 11 as a basis for establishing image processing parameters 3' for image processing to be effected on the image data 2 in the image processing unit 12, a parameter file 15 storing various image processing parameters, and an image reproduction unit 16 such as a printer or monitor for reproducing, as a visible image, image data 2' image-processed in the image processing unit 12.

The medical imaging systems 20 can access the storage medium 10 via the network, and sets of image data 2 that the medical imaging systems 20 acquire by imaging objects can be stored in the storage medium 10 via the network.

The network includes medical imaging systems 20 of different generations and the image processing parameters 3 attached to the image data 2 stored in the storage medium 10 include some that are not usable in common among all of the medical imaging systems 20.

The image processing parameters 3 are parameters required when the image data 2 are subjected to frequency processing, gradation processing and other types of image enhancement processing, enlargement/reduction processing, formatting of number of displayed images and the like. The image processing parameters 3 for the different kinds of image processing are stored in the parameter file 15. The key information is information that does not vary between different types of image processing to be carried out on the image data 2. This information includes, for example, the portion of the object that was imaged and the imaging method used at the time the image data were acquired. The image data key information 1 is the same for all sets of image data 2 acquired, for example, by imaging the same object portion or by using the same imaging method, irrespective of the image processing to be conducted.

The operation according to the image processing method and system of this embodiment will now be explained. The case where one of the medical imaging systems 20 reads image data 2 from the storage medium 10 and reproduces the read image data 2 will be explained first. The read unit 11 of the medical imaging system 20 first reads image data 2 and image processing parameters 3 stored in the storage medium 10 and forwards them to the image processing unit 12. If the medical imaging system 20 is of a recent generation and the image data 2 it is attempting to reproduce were produced by an earlier generation medical imaging system, then, ordinarily, not all of the image processing parameters 3 attached to the image data 2 will be usable for the image processing conducted by the image processing unit 12 of the newer system.

For instance, it may happen that a set of image data 2 stored in the storage medium 10 is attached with only image processing parameters 3 for frequency processing and gradation processing, while the more advanced image processing unit 12 requires parameters for conducting enlargement/reduction image processing in addition to the frequency and gradation processing. Therefore, since the old type image data 2 are not attached with an image processing parameter 3 for enlargement/reduction processing, the image data 2 can be subjected to only frequency processing and gradation processing and cannot be subjected to enlargement/reduction processing.

In the invention, situations of this nature are dealt with by sending the key information 1 appended to the image data 2 and read by the read unit 11 together with the image data 2 to the image processing parameter setting unit 13, which, based on the key information 1, establishes new image processing parameters 3' including those absent in the image data 2. More specifically, the image data 2 are accompanied by the key information 1 specifying the imaged portion, the imaging method and the like, while the types of image processing to be effected for the image portion, the imaging method and the like are predefined in the image processing unit 12 of the medical imaging system 20. From this it follows that the type or types of image processing required for the image data 2 can be ascertained from the key information 1 appended to the image data 2 and read together therewith. Therefore, based on the key information 1 read by the read unit 11, the image processing parameter setting unit 13 reads from the parameter file 15 the image processing parameters 3 absent in image data 2 to be reproduced, establishes image processing parameters 3' defining the types of image processing to be effected on the image data 2, and sends the image processing parameters 3' to the image processing unit 12.

The image processing unit 12 image-processes the image data 2 based on the image processing parameters 3' received from the image processing parameter setting unit 13. The image data 2' image-processed by the image processing unit 12 are forwarded to the image reproduction unit 16, where the are reproduced by a monitor or printer.

Thus when a more advanced medical imaging system 20 attempts to reproduce image data 2 relating to an image taken by a less advanced medical imaging system and attached with only outmoded image processing parameters 3, this embodiment of the invention enables the more advanced medical imaging system 20 nevertheless to effect the image processing using up-to-date image processing parameters 3' established, based on the key information 1 appended to the image data 2, to be usable by the more advanced medical imaging system 20. Therefore, without need for any special operations by the operator, the more advanced image processing features of the newer type medical imaging system 20 can be used to image-process even outmoded image data and thus provide a reproduced image with improved diagnostic utility.

Although the foregoing embodiment is configured to reproduce image data 2 not attached with certain image processing parameters 3 needed for advanced image processing by establishing new image processing parameters 3' that it then uses to image-process the image data 2, it can be further configured to be also capable of image-processing image data 2 not attached with certain image processing parameters 3 needed for advanced image processing based on only the image processing parameters 3 attached to the image data 2 without establishing new image processing parameters 3'. In this case, the medical imaging system 20 is preferably provided with a selection switch for selecting whether the image processing is to be effected using the image processing parameters 3 or is to be effected using new image processing parameters 3'.

The aforesaid embodiment was explained only with respect to the case where outmoded image data 2 are not attached with one or more image processing parameters 3 required for advanced image processing conducted by a newer medical imaging system 20. However, a case may arise in which outmoded image data 2 are attached with all image processing parameters 3 for the types of image processing effected by a newer medical imaging system 20 but the newer medical imaging system 20 effects the image processing concerned in an improved manner to obtain an image with higher diagnosis utility. The invention deals with this situation by establishing new image processing parameters 3' based on the key information 1 attached to the image data 2 and effecting image processing in the medical imaging system 20 based on the newly established image processing parameter 3' to reproduce an image with enhanced diagnostic utility.

What is claimed is:

1. A medical image processing method wherein a storage medium storing medical image data, key information appended to the medical image data, and image processing parameters attached to the medical image data and representing image processing to be effected on the medical image data is accessed to read the medical image data and the image processing parameters and the read medical image data are processed based on the image processing parameters, the image processing method comprising:
  reading the key information when one or more image processing parameters attached to the medical image data are inappropriate for the image processing,
  establishing, based on the read key information, new image processing parameters appropriate for the image processing, and
  image-processing the medical image data based on the new image processing parameters,
  wherein said key information identifies an object being imaged in addition to establishing the new image processing parameters.

2. An image processing method according claim 1, wherein the image processing can be switched between image processing using the attached image processing parameters and image processing using new image processing parameters when one or more image processing parameters attached to the image data are inappropriate for the image processing.

3. A medical image processing system comprising:
  a storage medium storing medical image data, key information appended to the medical image data, and image processing parameters attached to the medical image data and representing image processing to be effected on the medical image data,
  reading means for reading the medical image data and the image processing parameters from the storage medium,
  image processing means for image-processing the medical image data read by the reading means based on the image processing parameters,
  key information reading means for reading the key information when one or more image processing parameters attached to the medical image data are inappropriate for the image processing to be conducted by the image processing means, and parameter setting means for establishing, based on the key information read by the key information reading means, new image processing parameters appropriate for the image processing to be conducted by the image processing means, the image processing means being capable of image-processing the medical image data based on the new image processing parameters established by the parameter setting means, and wherein said key information identifies an object being imaged in addition to establishing new image processing parameters.

4. An image processing system according to claim 3, further comprising switching means for switching the image processing conducted by the image processing means between image processing using the attached image processing parameters and image processing using new image processing parameters when one or more image processing parameters attached to the image data are inappropriate for the image processing.

5. The method of claim 1, wherein said image processing parameters at least one of: frequency processing parameters, gradation processing parameters, enlargement and reduction parameters, and multiple image processing parameters.

6. The system of claim 3, wherein said image processing parameters at least one of: frequency processing parameters, gradation processing parameters, enlargement and reduction parameters, and multiple image processing.

7. A medical image processing method for processing images comprising steps of:

reading medical image data, key data, and image processing parameters from a storage medium, wherein said image processing parameters comprise at least one of: frequency processing parameters, gradation processing parameters, enlargement and reduction parameters, and multiple image processing parameters, wherein the key data identifies an object being imaged;

receiving the medical image data, key data and image processing parameters in an image processing device;

determining whether the image processing parameters received by the image processing device are updated for processing by the image processing device;

establishing new image processing parameters based on the key data when the determining step indicates that the received image processing parameters are not updated; and processing the image data based on the new processing parameters, said key information identifying the object to be imaged in addition to establishing new image processing parameters.

8. The method according to claim 7, wherein said key data comprises one of: an object being imaged and a method by which the object is imaged.

9. A system for medical image processing comprising:

a device in a receiving apparatus for reading medical image data, key data, and image processing parameters from a storage medium, wherein said image processing parameters comprise at least one of: frequency processing parameters, gradation processing parameters, enlargement and reduction parameters, and multiple image processing parameters and wherein the key data identifies an object being imaged;

a device for determining whether the image processing parameters received by the receiving apparatus device are updated for processing by the receiving apparatus;

a device for establishing new image processing parameters based on the key data when the determining device indicates that the received image processing parameters are not updated; and device for processing the image data based on the new processing parameters, said key data identifying the object being imaged in addition to establishing new processing parameters.

10. The system according to claim 9, wherein said key data comprises one of: an object being imaged and a method by which the object is imaged.

11. The method according to claim 7, wherein the step of establishing new image processing parameters is performed automatically.

12. The system according to claim 9, wherein the device for establishing new image processing parameters establishes the new image processing parameters automatically.

13. The method according to claim 1, wherein the step of establishing new image processing parameters comprises appending image parameter processing information based on the key information.

14. The system according to claim 3, wherein the parameter setting means establishes new image processing parameters by appending parameters based on the key information.

15. The method of claim 1, wherein the key information remains constant for each object being imaged.

16. The system of claim 3, wherein the key information remains constant for each object being imaged.

17. The method of claim 7, wherein the key data remains constant for each object being imaged.

18. The system of claim 9, wherein the key data remains constant for each object being imaged.

19. The method of claim 1, wherein the medical image data are inappropriate for processing when determined to include an outdated format for image processing.

20. The system of claim 3, further comprising a determining device that determines the medical image data are inappropriate for processing when determined to include an outdated format for image processing.

* * * * *